(12) United States Patent
Cheng et al.

(10) Patent No.: US 7,430,014 B2
(45) Date of Patent: Sep. 30, 2008

(54) DE-INTERLACING DEVICE CAPABLE OF DE-INTERLACING VIDEO FIELDS ADAPTIVELY ACCORDING TO MOTION RATIO AND ASSOCIATED METHOD

(75) Inventors: Kun-Nan Cheng, Hsin-Chu (TW); Zhi-Ren Chang, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 528 days.

(21) Appl. No.: 10/907,184

(22) Filed: Mar. 23, 2005

(65) Prior Publication Data

US 2005/0219410 A1    Oct. 6, 2005

Related U.S. Application Data

(60) Provisional application No. 60/558,568, filed on Apr. 2, 2004.

(51) Int. Cl.
*H04N 7/01* (2006.01)
(52) U.S. Cl. .................. 348/448; 348/452; 348/451; 348/700
(58) Field of Classification Search .......... 348/452, 348/451, 448, 459, 449, 441, 620, 699, 700; 382/236; 375/240.16
See application file for complete search history.

(56) References Cited

U.S. PATENT DOCUMENTS

| | | | | | |
|---|---|---|---|---|---|
| 5,467,138 | A | * | 11/1995 | Gove | 348/452 |
| 5,521,644 | A | * | 5/1996 | Sezan et al. | 348/452 |
| 5,796,437 | A | * | 8/1998 | Muraji et al. | 348/452 |
| 6,108,041 | A | * | 8/2000 | Faroudja et al. | 348/446 |
| 6,348,949 | B1 | * | 2/2002 | McVeigh | 348/452 |
| 6,421,090 | B1 | * | 7/2002 | Jiang et al. | 348/452 |

OTHER PUBLICATIONS

Jonathan Michael Roberts, "Attentive Visual Tracking and Trajectory Estimation for Dynamic Scene Segmentation", Submitted for the degree of Doctor of Philosophy, Faculty of Engineering and Applied Science Department of Electronics and Computer Science University of Southampton, Dec. 1994, p. 105~136.

* cited by examiner

*Primary Examiner*—David Ometz
*Assistant Examiner*—Jean W Désir
(74) *Attorney, Agent, or Firm*—Winston Hsu

(57) ABSTRACT

A de-interlacing device capable of de-interlacing a video field adaptively and associated method, the device includes a video field detector for detecting a video field and for outputting a motion detection parameter, a motion detector for detecting a motion difference between the video frame and at least one video frame neighboring the video frame, and for determining a motion ratio for the motion difference according to the motion detection parameter, and a de-interlacing unit for de-interlacing the video field according to the motion ratio output from the motion detector.

20 Claims, 9 Drawing Sheets

DE-INTERLACING DEVICE CAPABLE OF DE-INTERLACING VIDEO FIELDS ADAPTIVELY ACCORDING TO MOTION RATIO AND ASSOCIATED METHOD

CROSS REFERENCE TO RELATED APPLICATIONS

This application claims the benefit of U.S. Provisional Application No. 60/558,568, filed Apr. 2, 2004, and included herein by reference.

BACKGROUND OF INVENTION

1. Field of the Invention

The present invention relates to a de-interlacing device and associated method, more particularly, a de-interlacing device capable of de-interlacing a video field adaptively and associated method.

2. Description of the Prior Art

When television is presented to the public, the technology of updating frequency at 60 times per second and writing at 525 lines (this is the National Television Standard Committee, a.k.a., NTSC) or updating frequency at 50 times per second and writing at 625 lines (this is the Phase Alternating Line, a.k.a., PAL) remains costly. Even scan lines and odd scan lines are transmitted each time alternatively, which is known as interlace. In the case of NTSC or PAL, the result is either, respectively, 30 or 25 frames being shown per second. The reduced frame rate reduces the hardware complexity while the overall bandwidth requirement is reduced because of the interlacing. The display fluency of the interlaced picture is still acceptable to the human eye.

Later personal computers were presented to the public. The monitor technology utilized by the personal computer is known as progressive scan. Liquid crystal display (LCD) and plasma display are only capable of displaying progressive scan images. If an interlace image is inputted into an LCD or plasma display then de-interlacing technology is thus needed.

FIG. 1 illustrates a functional block diagram of a conventional de-interlacing device 10. The de-interlacing device 10 comprises a de-interlacing unit 12 and a motion detector 14. The motion detector 14 detects a motion difference between a video field Field (n) and a plurality of video fields temporarily neighboring the video field, such as, Field (n−2), Field (n−1), and Field (n+1). The motion detector 14 outputs a motion ratio MR. The motion ratio MR corresponds to the motion ratio function of FIG. 2. The de-interlacing unit 12 performs de-interlacing according to the motion ratio MR and the neighboring video fields of Field (n).

The conventional motion detector 14 outputs a motion ratio MR according to a single motion ratio function regardless of the properties of the video field Field (n). For example, given this single motion ratio function, the image motion difference of a man dressed in black at night is insignificant; it can easily be incorrectly interpreted as a static picture. In another example, if a high motion ratio function is selected then motion change is easily spotted; however, black letterings on a white board will appear to be shaking or showing unstable flashes.

SUMMARY OF INVENTION

The claimed invention discloses an adaptive de-interlacing device comprising: a video field detector for detecting the video field to output a motion detection parameter; a motion detector for detecting a motion difference between the video field and a plurality of adjacent video fields neighboring the video field and for determining a motion ratio for the motion difference according to the motion detection parameter; and a de-interlacing unit for de-interlacing the video field adaptively according to the motion ratio output from the motion detector.

The claimed invention further discloses a method of de-interlacing a video field adaptively, the method comprising: detecting a plurality of pixel values of the video field to output a motion detection parameter; detecting a motion difference between the video field and a plurality of the adjacent video fields neighboring the video field; determining a motion ratio for the motion difference according to the motion detection parameter; and de-interlacing the video field adaptively according to the motion ratio. Further, step of detecting the pixel values of the video field utilizes the motion ratio function defined in the motion detection parameter, the motion difference is mapped to the motion ratio through the motion ratio function, and the motion detection parameter comprises a starting point, a slope, and a saturation value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
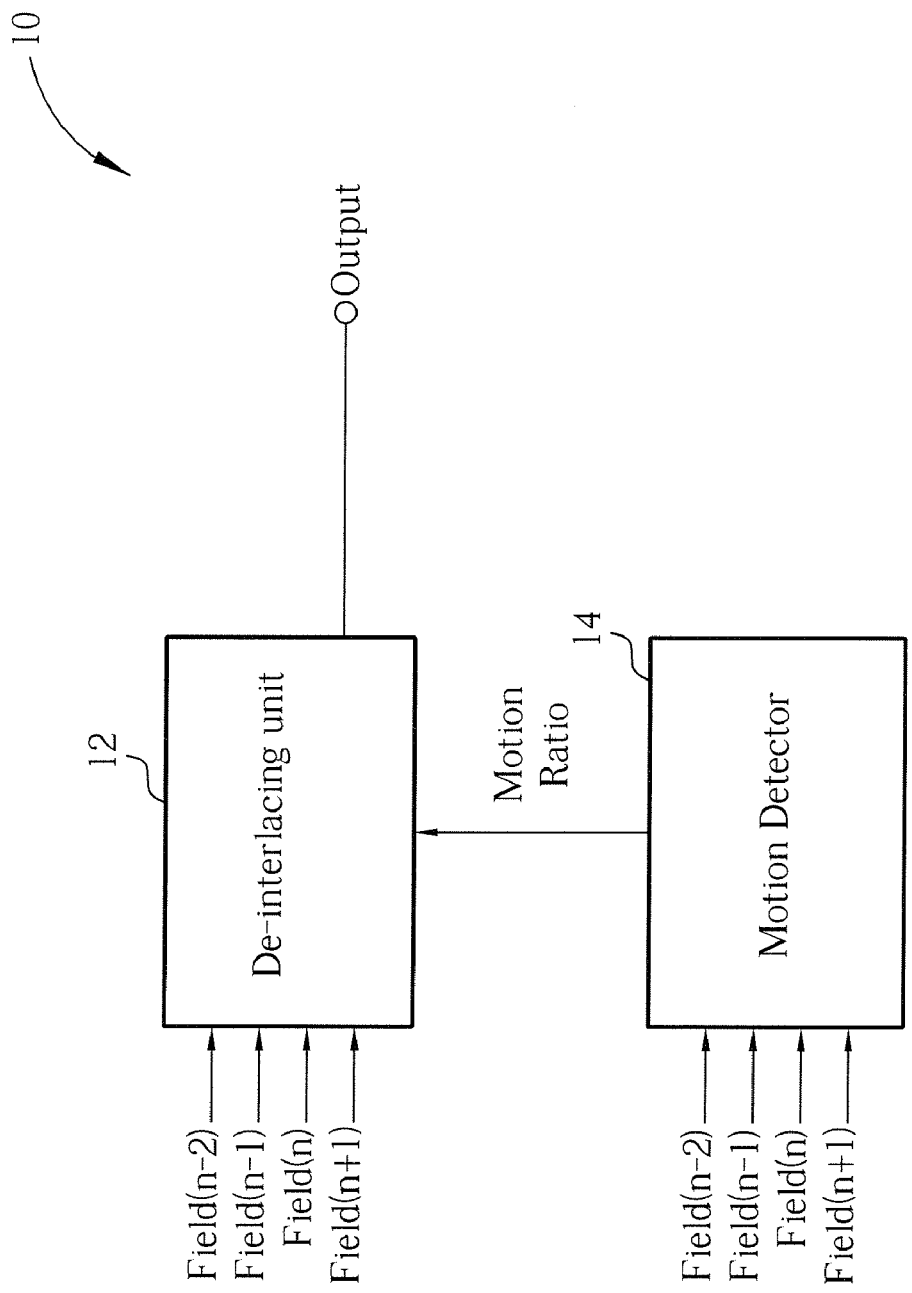
FIG. 1 illustrates a functional block diagram of a conventional de-interlacing device.
Figure 2:
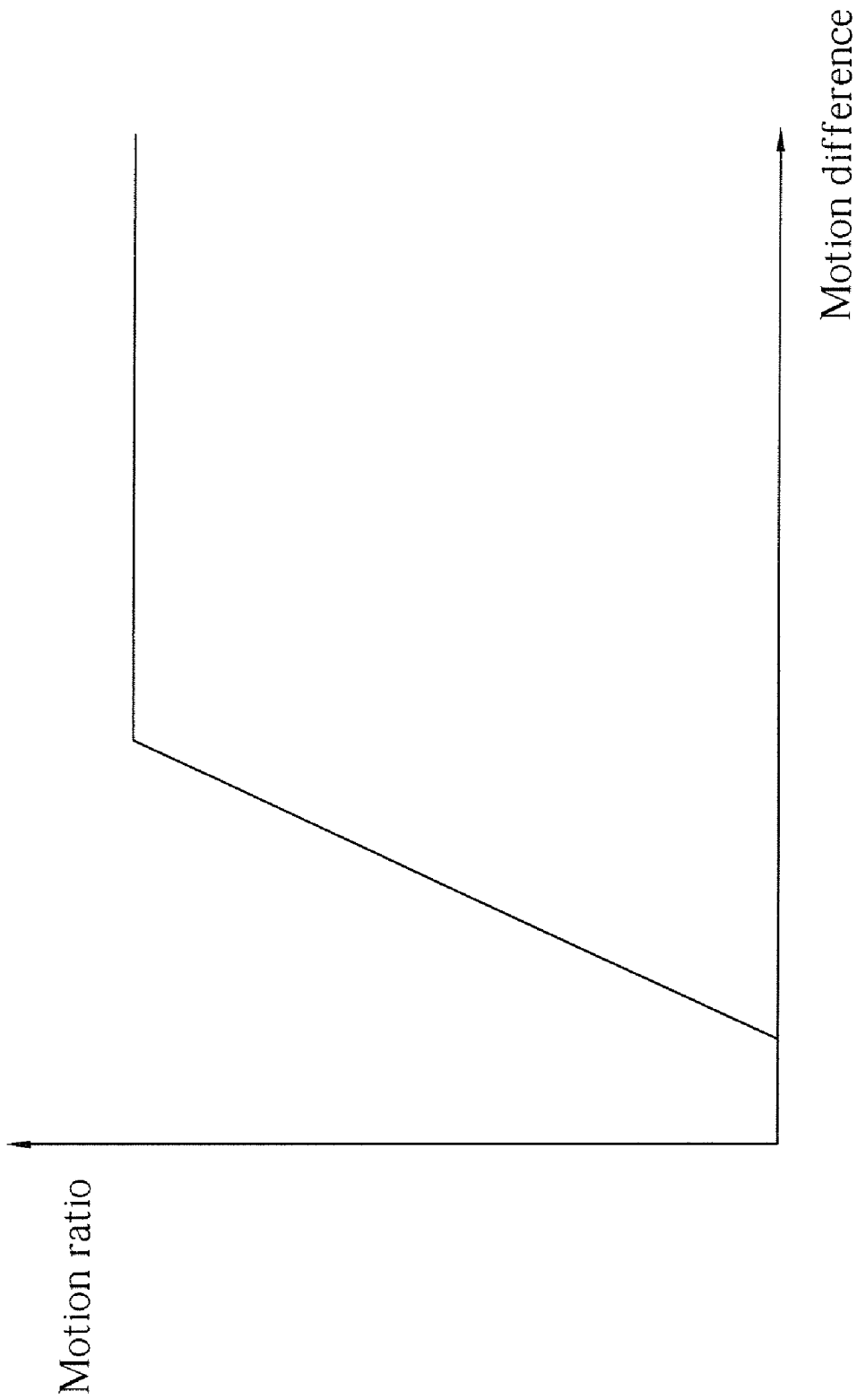
FIG. 2 illustrates a functional diagram of motion ratio function.
Figure 3:
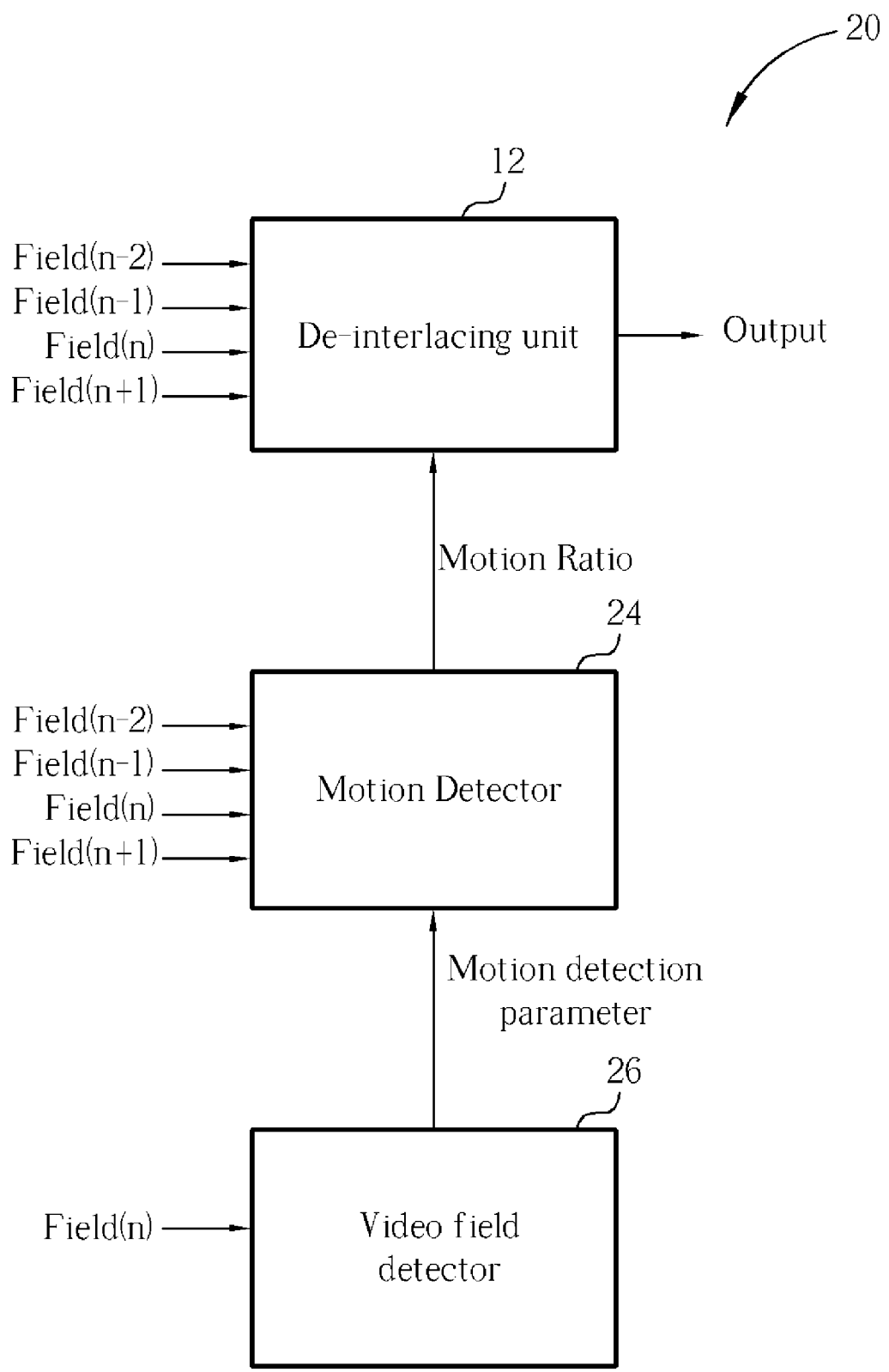
FIG. 3 illustrates a functional block diagram of an adaptive de-interlacing device according to the preferred embodiment of the present invention.
Figure 5:
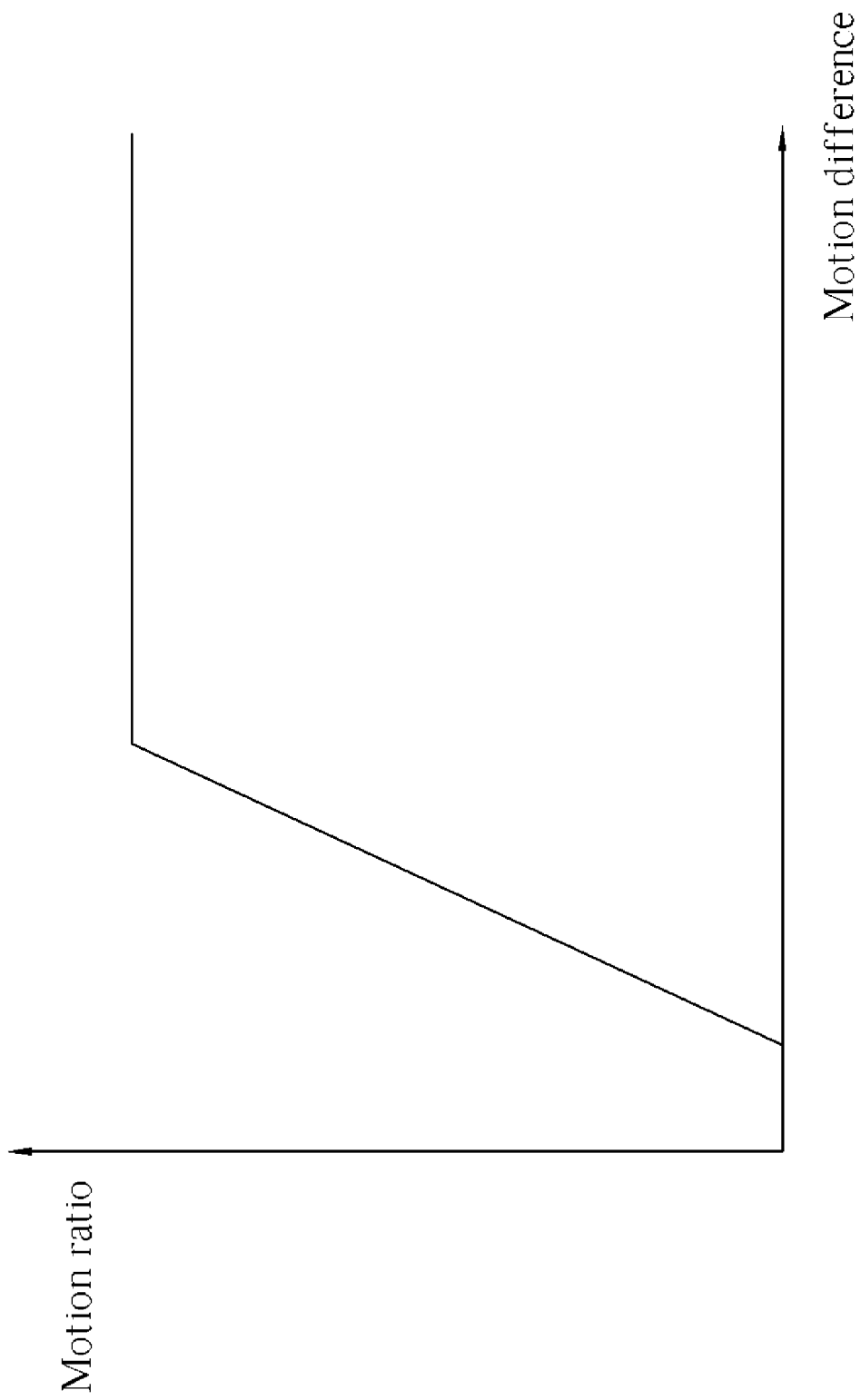
FIG. 5 to FIG. 7 illustrates functional diagrams of a motion detector comprising a plurality of motion ratio functions according to the adaptive de-interlacing device of FIG. 3.
Figure 6:
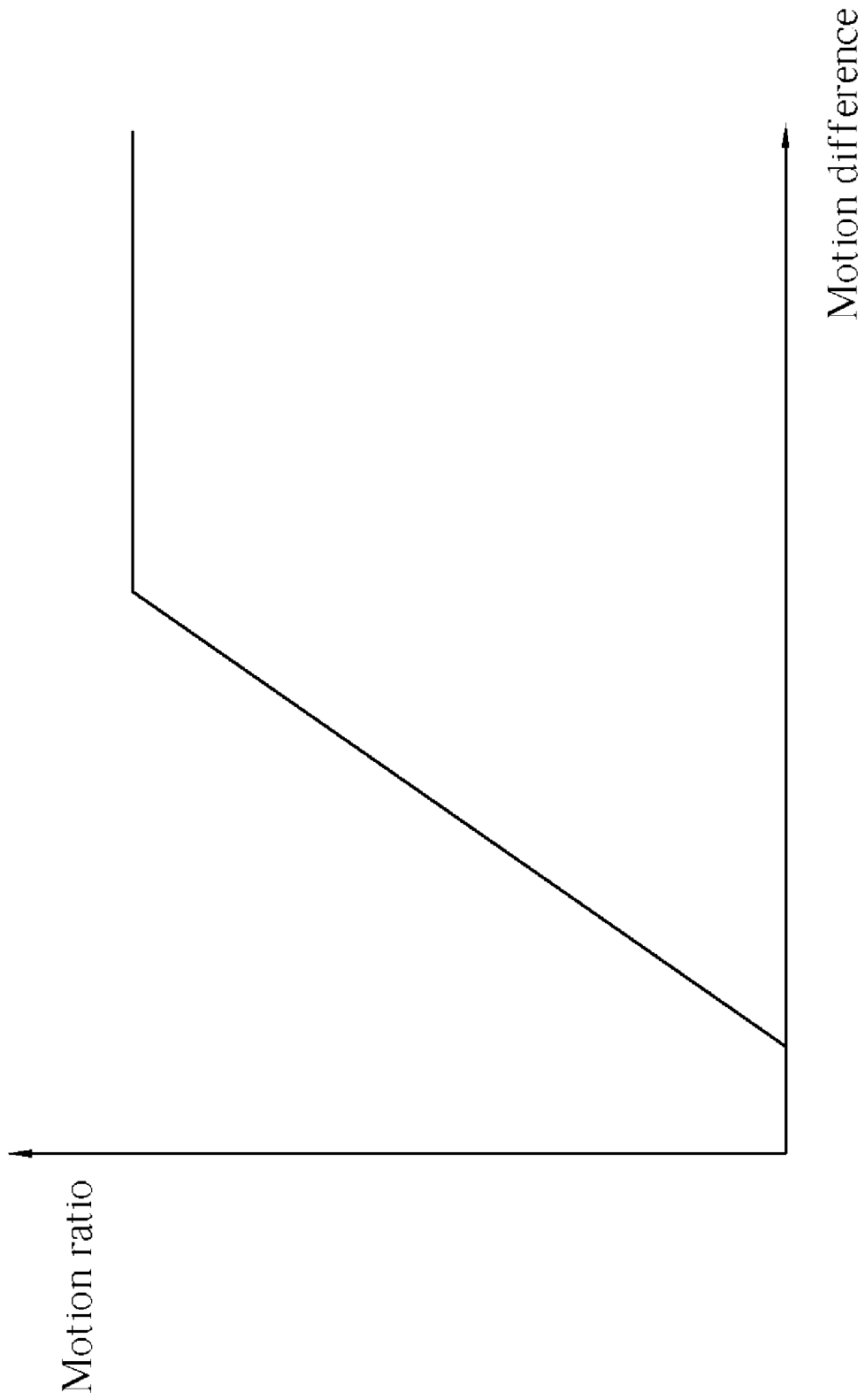
Figure 7:
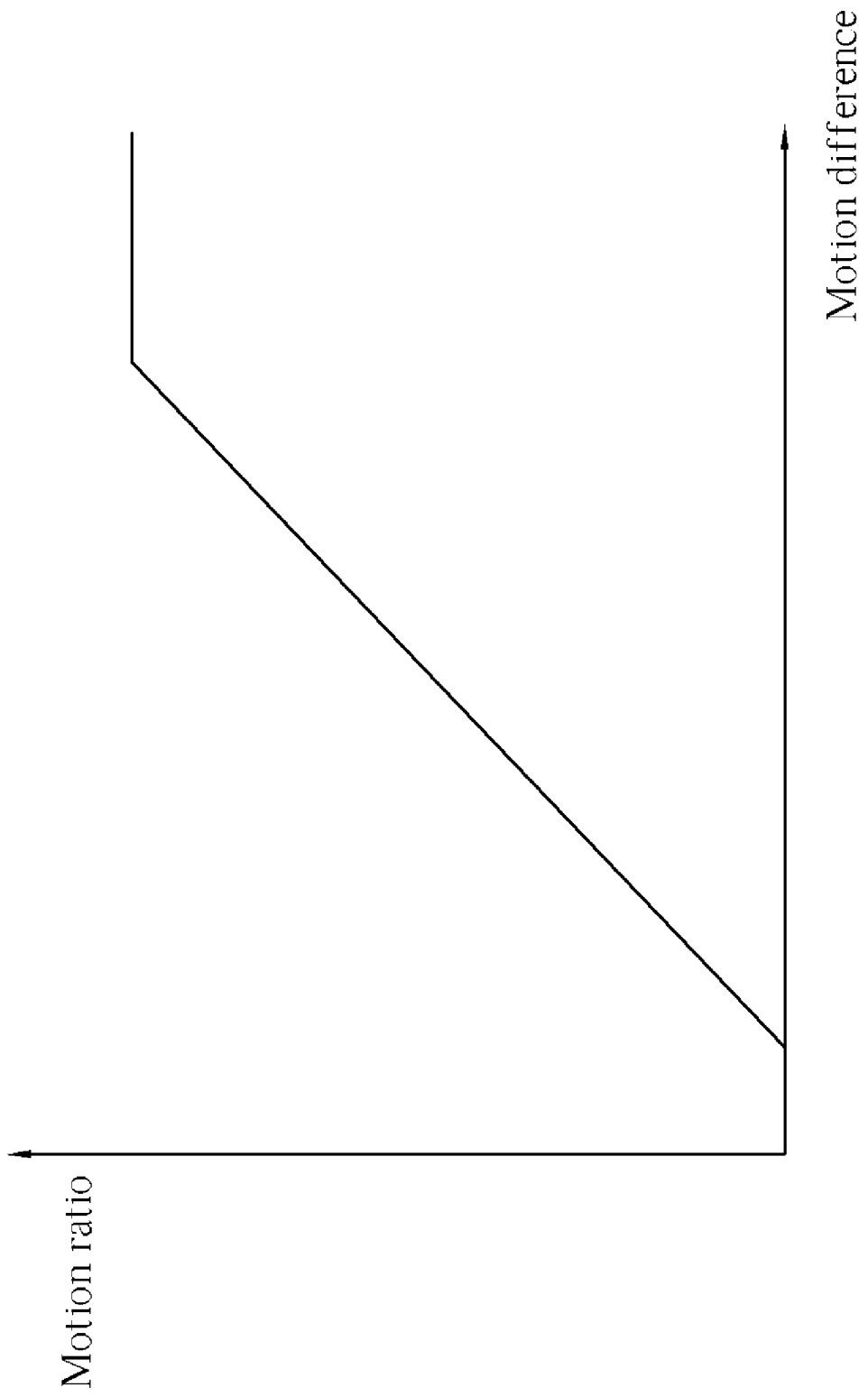

FIG. 3 illustrates a functional block diagram of an adaptive de-interlacing device 20 according to the preferred embodiment of the present invention. A video field detector 26 detects a pixel value of a video field Field (n) and outputs a motion detection parameter MDP; a motion detector 24 detects a motion difference MD corresponding to the video field Field (n), and selects a motion ratio function MRF from a plurality of motion ratio functions as shown in FIG. 5 to FIG. 7, including: a high motion ratio function MRFH, a medium motion ratio function MRFM, and a low motion ratio function MRFL. The particular motion ratio function MRF is selected by the motion detector 24 according to the MDP. Finally, the motion detector 24 outputs a motion ratio MR corresponding to the motion ratio function MRF by mapping the motion difference MD. A de-interlacing unit 12 de-interlaces the video field Field (n) according to the motion ratio MR outputted by the motion detector 24.

The video field detector 26 detects a scenery mode of the video field Field (n). For example, the scenery mode of each pixel that includes a high, medium, and low motion detection parameter MDP. The motion detector 24 detects the motion difference MD of the video field (n), for example, by referring to adjacent neighboring video fields Field (n−2), Field (n−1) and Field (n+1). For television signal, the video fields appear as even and odd video fields interlacing one another, preferably, the difference of the video fields Field (n) and Field (n−2) is an absolute value, which represents the difference for the adjacent neighboring scan line (i.e. the difference of adjacent even scan line or odd scan line). Additionally, the de-interlacing unit 12 later performs de-interlacing the adjacent neighboring even and odd video fields, therefore the difference of the corresponding scan preferably refers to the difference of adjacent neighboring (even or odd) scans to accurately determine the motion ratio MR. The complexity of the hardware and the available memory access bandwidth is involved with how many adjacent neighboring video fields are referred to. This embodiment illustrates only Field (n−2), Field (n−1), Field (n), and Field (n−1), which should not limit the scope of the present invention.

The motion detector 24 selects a motion ratio function MRF from a plurality of motion ratio functions (examples shown in FIG. 5 to FIG. 7) according to the motion detection parameter MDP. For example, the motion detection parameter MDP can provide the motion detector 24 with the characteristics associated with the motion ratio function MRF that includes parameters such as a starting point, a slope, or a saturation value. The motion detector 24 can utilize simple hardware to perform calculations to define the motion ratio function MRF according to the parameters. The motion detector 24 maps the motion difference MD to the motion ratio MR through the motion ratio function MRF. Alternatively, the video field detector 26 provides a proper lookup table, such as a high motion lookup table, a medium motion lookup table, and a low motion lookup table, for the motion detector 24 to look up, whereby the motion ratio MR is obtained from the motion difference MD by referencing to the proper lookup table.

Figure 4:
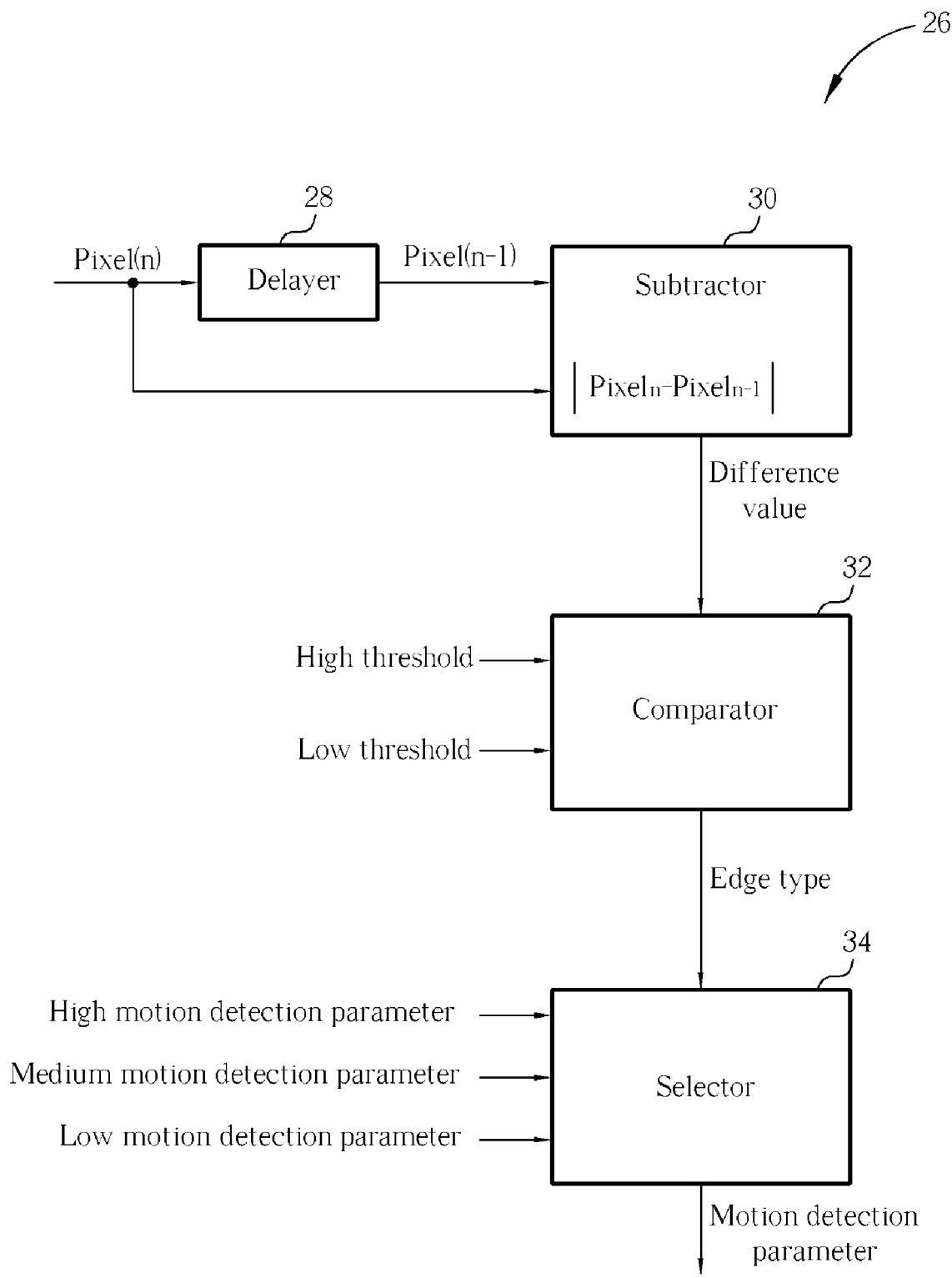
FIG. 4 illustrates a functional block diagram of a video field detector according to the adaptive de-interlacing device of FIG. 3.

FIG. 4 illustrates a functional block diagram of a video field detector 26 according to the preferred embodiment of the present invention. A delayer 28 delays Pixel (n) of the Field (n) to generate a delayed Pixel (n−1); a subtractor 30 generates a difference value DIFF between the Pixel (n) and the delayed Pixel (n−1); a comparator 32 compares the difference value DIFF with a plurality of thresholds TH, preferably including a high threshold THH and a low threshold THL. The comparator 32 is then able to output an edge type ET. A selector 34 selectively outputs the motion detection parameter MDP, from the plurality of motion detection parameters corresponding to the motion ratio functions, according to the edge type ET. The motion ratio functions include the high motion ratio function MRFH corresponding to the low motion detection parameter MDPL, the medium motion ratio function MRFM corresponding to the medium motion detection parameter MDPM, and the low motion ratio function MRFL corresponding to the high motion detection parameter MDPH.

Figure 8:
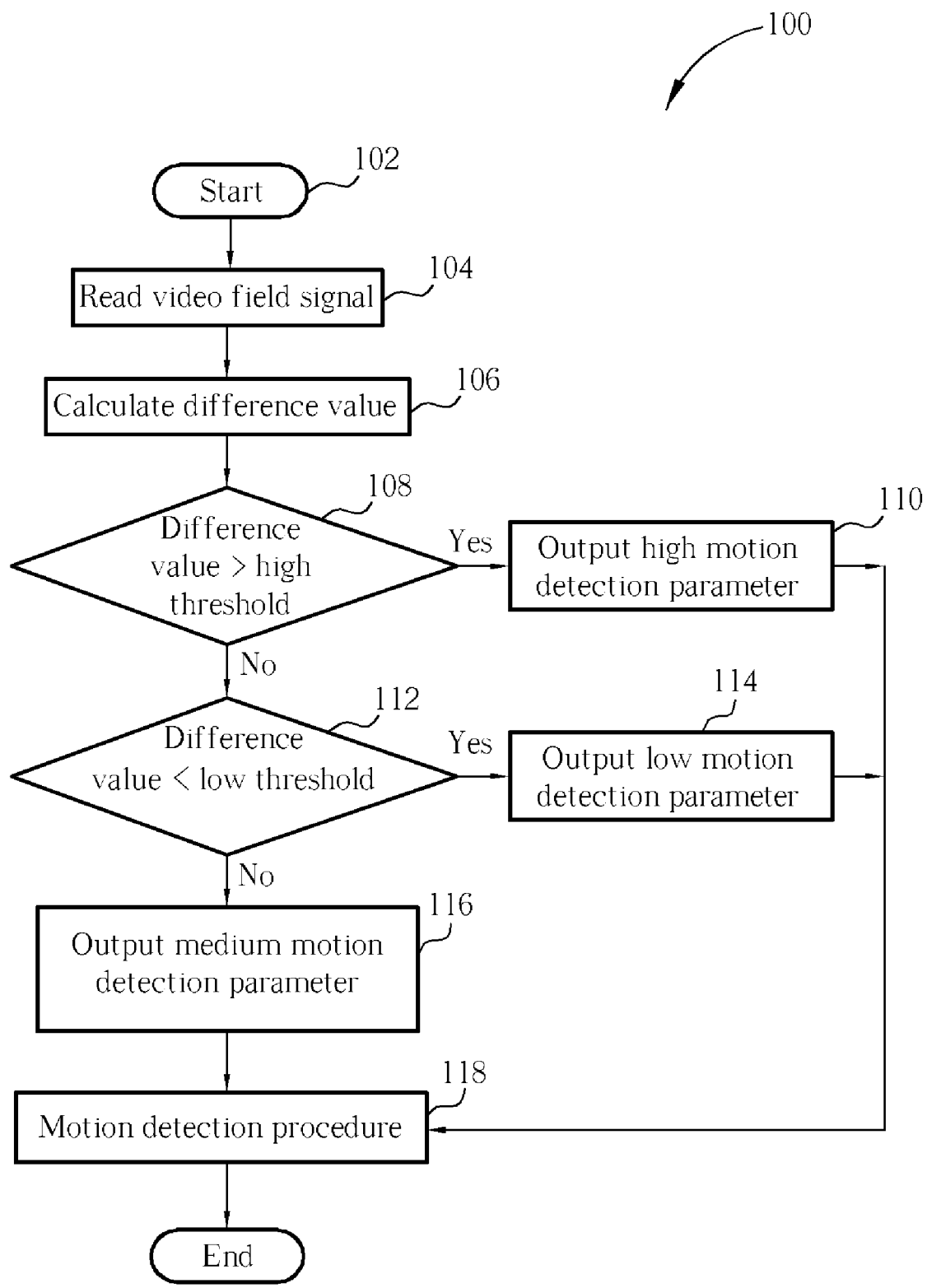
FIG. 8 illustrates a flowchart of a method of the adaptive de-interlacing device according to FIG. 3.

FIG. 8 illustrates a de-interlacing flowchart 100 associated with the module 20. The flow chart 100 comprises the following steps:

Step 102: Start;

Step 104: Read video field signal. For example, read the video field signal Field (n−2), Field (n−1), Field (n) and Field (n−1);

Step 106: Calculate difference value DIFF;

Step 108: If the difference value DIFF is greater than high threshold THH then perform step 110. If the different value DIFF is not greater than the high threshold THH then perform step 112;

Step 110: Output high motion detection parameter MDPH and execute step 118. For example, Field (n) comprises black letterings on a white board with the difference DIFF greater than the high threshold THH. Therefore, output the high motion detection parameter MDPH corresponding to the low motion ratio function MRFL;

Step 112: If the difference DIFF is less than the low threshold THL then execute step 114. If the difference DIFF is not less than the low threshold THL then execute step 116;

Step 114: Output low motion detection parameter MDPL then execute step 118. Field (n) is a man dressed in black at night when the difference DIFF is less than the low threshold THL. Therefore, output the low motion detection parameter MDPL corresponding to the high motion ratio function MRFH;

Step 116: Output medium detection parameter MDPM;

Step 118: Execute motion detection procedure; and

Step 120: End

If the difference DIFF is greater than the high threshold THH and the video field detector 26 outputs the high motion detection parameter MDPH corresponding to the low motion ratio function MRFL then the motion detector 24 will select the low motion ratio function MRFL of FIG. 7 according to the high motion detection parameter MDPH to output motion ratio MR by mapping the motion difference MD in the low ratio function MRFL. After that, the de-interlacing unit 12 de-interlaces the black lettering on the white board according to the motion ratio MR outputted by the motion detector 24. After de-interlacing, the black lettering on the white board will appear stable without shaking or unstable flashes. Furthermore, if the difference DIFF is smaller than the low threshold THL while the video field detector 26 outputs the low motion detection parameter MDPL, then the motion detector 24 will select the high motion ratio function MRFH of FIG. 5 according to the low motion detection parameter MDPL to output the motion ratio MR by mapping the motion difference MD through the high ratio function MRFH.

Figure 9:
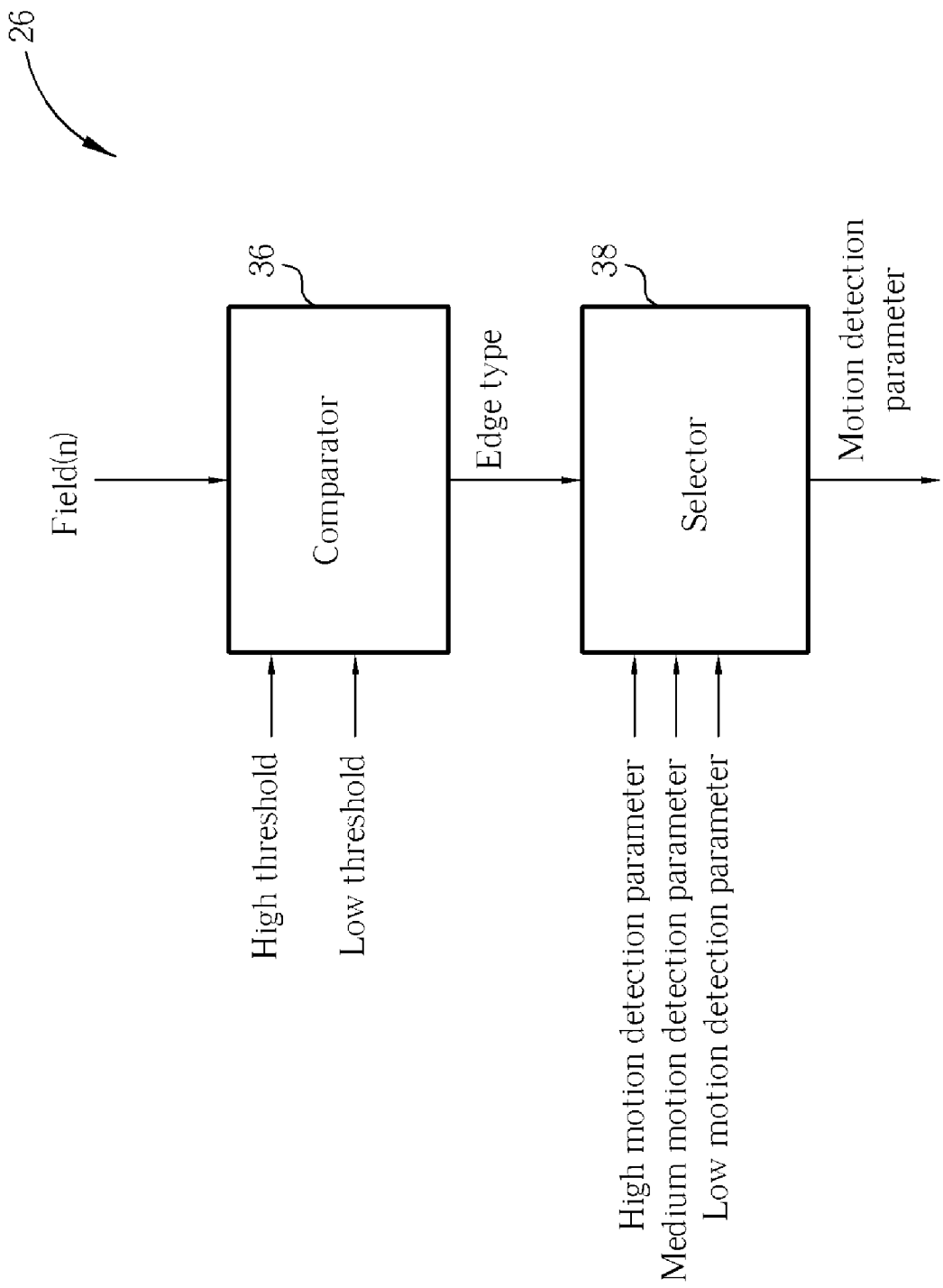
FIG. 9 illustrates another functional block diagram of the video field detector according to FIG. 3.

FIG. 9 illustrates a functional block diagram of a video field detector 26 according to another embodiment of the present invention. A comparator 36 compares pixel value of Field (n) with high threshold THH and low threshold THL to output an edge type ET. A selector 38 outputs motion detection parameter MDP according to the edge type ET.

In conclusion to the above mentioned, the present invention discloses an adaptive de-interlacing device comprising a de-interlacing unit 12, a motion detector 24, and a video field detector 26. The motion detector 24 comprises a plurality of motion ratio functions and the video field detector 26 adaptively controls the motion detector 24 to select and output the most suitable motion ratio function according to properties of Field (n) such as black lettering on a white board or a man dressed in black at night.

The present invention also discloses a method of de-interlacing a video field adaptively, the method comprising: detecting a pixel value of the video field to output a motion detection parameter; detecting a motion difference between the video field and a plurality of adjacent video fields; determining a motion ratio for the motion difference according to the motion detection parameter; and de-interlacing the video field adaptively according to the motion ratio; step of detecting pixel values of the video field maps the motion difference to the motion ratio utilizing the motion ratio function defined by the motion detection parameter, and the motion detection parameter comprises a starting point, a slope and a saturation value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A de-interlacing device capable of de-interlacing a video field adaptively, the de-interlacing device comprising:
    a video field detector for detecting the video field to output a motion detection parameter;
    a motion detector for detecting a motion difference of the video field and a plurality of adjacent video fields neighboring the video field, and for determining a motion ratio for the motion difference according to a motion ratio function selected on the fly from a plurality of motion ratio functions in response to a value of the motion detection parameter; and
    a de-interlacing unit for de-interlacing the video field adaptively according to the motion ratio output from the motion detector.

2. The de-interlacing device of claim 1 wherein the video field detector comprises:
    a delayer for delaying a pixel of the video field to generate a delayed pixel;
    a subtractor for generating a difference value between a pixel value of said pixel and a pixel value of said delayed pixel;
    a comparator for comparing the difference value and a plurality of thresholds to output an edge type; and
    a selector for outputting the motion detection parameter according to the edge type.

3. The de-interlacing device of claim 1 wherein the video field detector comprises:
    a comparator for comparing a pixel value for each pixel for the video field with a plurality of thresholds to output an edge type; and
    a selector for outputting the motion detection parameter according to the edge type.

4. The de-interlacing device of claim 1 wherein the motion detector generates the motion ratio by mapping the motion difference through a motion ratio function defined by the motion detection parameter.

5. The de-interlacing device of claim 1 wherein the motion detection parameter represents a lookup table such that the motion detector maps the motion difference to the motion ratio according to the lookup table.

6. The de-interlacing device of claim 1 wherein the adjacent video fields include three video fields nearest to the video field to be de-interlaced.

7. The de-interlacing device of claim 1 wherein the video field is an odd field.

8. The de-interlacing device of claim 1 wherein the video field is an even field.

9. The de-interlacing device of claim 2 wherein the plurality of thresholds comprises a high threshold and a low threshold.

10. The de-interlacing device of claim 3 wherein the plurality of thresholds comprises a high threshold and a low threshold.

11. The de-interlacing device of claim 4 wherein the motion detection parameter comprises a staffing point, a slope, and a saturation value.

12. The de-interlacing device of claim 5 wherein the lookup table is selected from a group consisting of a high motion lookup table, a medium motion lookup table, and a low motion lookup table.

13. A method of de-interlacing a video field adaptively, the method comprising:
    detecting a plurality of pixel values in the video field to output a motion detection parameter;
    detecting a motion difference between the video field and a plurality of adjacent video fields neighboring the video field;
    determining a motion ratio for the motion difference according to a motion ratio function selected on the fly from a plurality of motion ratio functions in response to a value of the motion detection parameter; and
    adaptively de-interlacing the video field according to the motion ratio.

14. The method of claim 13 wherein the step of detecting the pixel values maps the motion difference to the motion ratio utilizing a motion ratio function defined by the motion detection parameter.

15. The method of claim 13 wherein the step of detecting the pixel values maps the motion difference to the motion ratio through a lookup table.

16. The method of claim 13 wherein the adjacent video fields include three video fields nearest to the video field to be de-interlaced.

17. The method of claim 13 wherein the step of detecting the pixel values compares the pixel values with a plurality of thresholds to output an edge type according to the motion detection parameter outputted by the edge type.

18. The method of claim 13 wherein the step of detecting the pixel values comprises the following steps:
    delaying a pixel of the video field to generate a delayed pixel;
    calculating a difference value between the pixel and the delayed pixel;
    comparing the difference value and a plurality of thresholds to output an edge type; and
    outputting the motion detection parameter according to the edge type.

19. The method of claim 14 wherein the motion detection parameter comprises a starting point, a slope, and a saturation value.

20. The method of claim 18 wherein the difference value is an absolute difference value which is obtained from the difference of the pixel and the delayed pixel.

* * * * *